April 14, 1959   J. R. KLOMPAR   2,882,071
BREAKAWAY BAND-TYPE CLAMP FOR FLANGED PIPES
Filed Oct. 10, 1955
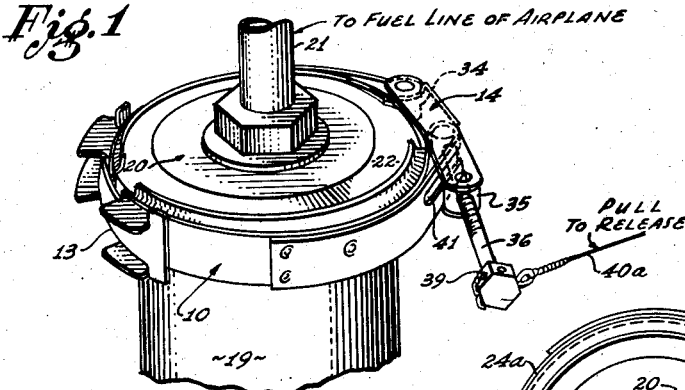
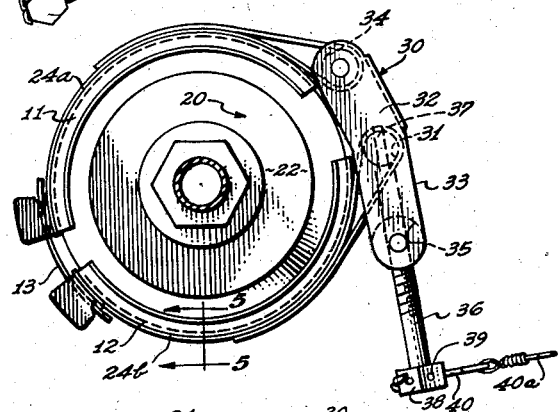
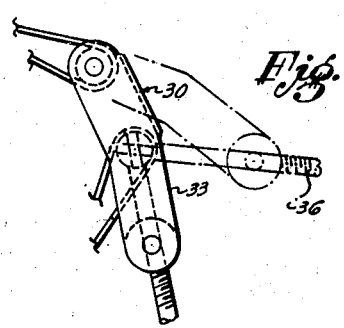
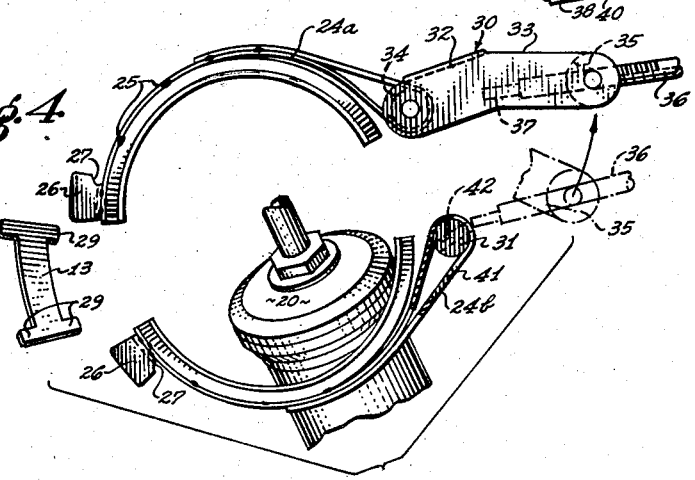
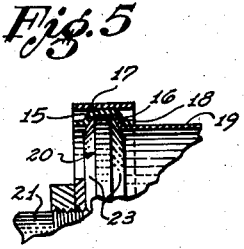
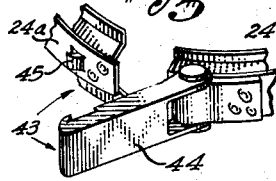
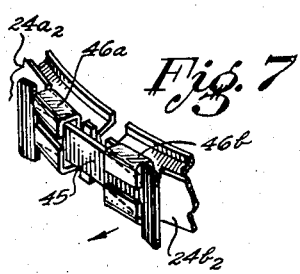
INVENTOR:
Joseph R. Klompar
By Herbert E. Metcalf
His Patent Attorneys

United States Patent Office

2,882,071
Patented Apr. 14, 1959

2,882,071

BREAKAWAY BAND-TYPE CLAMP FOR FLANGED PIPES

Joseph R. Klompar, Manhattan Beach, Calif., assignor to Northrop Aircraft, Inc., Hawthorne, Calif., a corporation of California Application October 10, 1955, Serial No. 539,499

1 Claim. (Cl. 285—409)

This invention relates to readily releasable clamp means for connecting parts together and is particularly designed for joining pipes leading from disposable tanks to the fuel lines of aircraft in connection with which use the invention will be hereinafter described as providing an illustrative embodiment of the invention.

It is to be understood however that the invention is not to be considered as limited to such use.

It is necessary therefore that the clamp when released by a releasing element should immediately move entirely out of engagement with the parts clamped together and thereby prevent any possibility of binding of the clamp and pipe ends.

Many types of aircraft are fitted with auxiliary fuel tanks suspended rigidly from mounting racks projecting from the lower surface of the wing by releasable fittings. Any movement of the tanks relative to the wing is prevented by the fittings until they are released so that the pipes connecting the fuel lines of the airplane to the auxiliary tanks may be fitted with detachable joints requiring only that the joint be relieved of axially exerted force sufficient to ensure liquid tight connection between the end of the pipe connected to the tank and the end of the pipe connected to the fuel lines of the plane. Relative movements between the tank and plane wings may take place at the time of release of the tank due to the force of the airstream over the wing and tank surfaces and it is very important that such movements are freely made since any slight binding of the releasable clamp with the pipe ends may result in the tank assuming a tumbling movement which might result in the tank striking the wing or other surfaces of the plane.

It is the general object of this invention to provide a readily releasable clamping means of simple construction which will meet the requirements outlined above.

A particular object of the invention is to provide clamping means of the kind described which is of simple construction and positive in action.

A further object of the invention is to provide such clamping means in a construction which comprises few parts, is light in weight and inexpensive to produce yet possesses adequate strength to be reliable in performance.

Another object of the invention is to provide a clamping means for detachably connecting tubular members such as those in a fuel line, the clamping means functioning efficiently with various joint arrangements and being capable of various modifications in structure.

A still further object of the invention is to provide a joint clamping arrangement in which a toggle clamp is incorporated with adjustment means to provide breaking of the toggle upon application of a predetermined force on a toggle releasing member, enabling minor variations of manufacture to be compensated for.

With the objects above outlined and others which will appear from the following specification, the invention comprises a quick disconnect clamp for detachably holding separable members together in a joint, comprising: separate rigid joint engaging elements; means connecting adjacent ends of said elements to limit movement of said ends away from one another; toggle latch means secured to other ends arranged to be brought into facing relation of said rigid joint engaging elements; and resilient means connected to said rigid elements enabling said toggle latch means to be forced over dead center when placing said quick disconnect clamp in operative position and when releasing said clamp.

In the drawings:

Figure 1 is a perspective view showing the quickly releasable clamping means constructed according to one form of the invention in "made up" or operative position;

Figure 2 is a plan view from above of the parts shown in Figure 1;

Figure 3 is a fragmentary view of clamping means shown in Figures 1 and 2 moving toward released position;

Figure 4 is a perspective view of the clamping means shown in Figure 3 in fully released position, the pipe connected to the tank having dropped away some distance clear of the clamp; a portion of a strap being shown in section to show a slot therein;

Figure 5 is a fragmentary cross section on the line 5—5 in Figure 2;

Figure 6 is a fragmentary perspective view showing an alternative form of means connecting the parts of the clamp; and Figure 7 is a fragmentary perspective view of another form of means connecting the parts of the clamp.

Referring now to Figures 1 through 5, the numeral 10 indicates generally the quickly detachable clamping means of this invention which comprises rigid joint engaging elements 11, 12 of arcuate configuration. The elements 11 and 12 are joined together at adjacent ends by a connector strip 13 and at their opposite adjacent ends by a toggle latch 14 to define a generally circular clamping device. The term "toggle latch" is intended to indicate one in which parts are moved past a dead center position to retain the latch in engaged position and when moved to released position.

The securing elements are formed with outwardly sloping walls 15, 16 as shown in Figure 5, separated by a flat portion 17. The interior configuration of the rigid securing elements 11 and 12 is designed to clamp the belled out end 18 of a pipe 19 connected to a disposable tank, for instance against a fitting generally indicated at 20 secured to the end of a pipe 21 connected to the fuel line of a plane.

As shown most clearly in Figures 4 and 5 the fitting 20 comprises a disc 22 secured in any suitable way to the end of pipe 21 and provided with a double bevelled edge 23, one edge being engaged by one sloping wall 15 of the rigid elements 11 and 12, while the belled out end 18 of pipe 19 is clamped between the other bevelled edge of the disc and the other sloping wall 16 of elements 11 and 12.

A pair of straps 24a and 24b, constructed of resilient material such as spring steel or the like, are secured to the elements 11 and 12 respectively. The straps 24a and 24b are secured to the rigid elements at points intermediate the ends of the straps, as by spot welding or the like as indicated by the numeral 25, to provide free looped adjacent ends as shown in Figures 1–4, inclusive. At one of the facing ends of the straps, upstanding ears 26 are either struck up from the sides at the ends of the straps, or as shown in Figure 4, the ears are bent up from separate pieces of metal welded to the ends of the straps. Preferably the outward edges of the ears are inclined at an acute angle to the surface of the strips, or as shown in Figure 4 may be nicked at the base of the edges as shown at 27. The connector strip 13 is provided at each end with laterally extending lugs 29 which engage with and act to releasably connect strips 11 and 12 when drawn taut by the toggle clamp 14. The latter comprises two parts, 30 and 31. Part 30 comprises a channel body portion 32 with its open side positioned toward the disc 22, and having a portion of its back portion cut away to leave an opening, indicated at 33 between the side portions of the body.

A rotatable abutment 34 is mounted between the side walls at one end of the body portion of the clamp 14, the strip 24a being reversely bent around roller 34 and spot welded to the main portion of the strip. A second rotatable abutment 35 is provided with a diametral hole which is threaded to receive a threaded pin 36 having a reduced end portion 37 and with a nut shaped head 38 which is provided with a plurality of diametral holes 39. A cotter pin 40 may be mounted in one of the holes and serves to secure one end of a lanyard 40a by pulling which the clamp may be released.

Part 31 of the clamp consists of a rotatable abutment around which the end of strip 24b is reversely bent and spot welded to the main portion of the strap. A slot 41 is provided in the portion of the strap at and adjacent the rotary abutment 31 for a purpose which will later appear.

The reduced end 37 of pin 36 fits freely into a diametral hole 42 in the rotatable abutment 31.

It is to be noted that the straps 24a and 24b tend to spring away from the arcuate surface of the rigid members 11 and 12 between the points at which they are spot welded thereto and the clamp, the resilience thereby provided enabling the pin to be forced over center and securely retained in this position until forcibly moved in the opposite direction by a pull on the lanyard 40a.

The provision of threaded engagement between the pin 36 and abutment 35 enables the clamp to be adjusted by forcing the abutments 31 and 35 by the use of a wrench on the nut shaped head 38, to draw the rigid V-shaped channel portions tightly against the double bevelled edge of disc 22. When the toggle clamp 10 is released, the resilience given by straps 24a and 24b with the loose connection between the straps afforded by connector strip 13 and the pressure of the sloped edges of disc 22 with the V-shaped channel of members 11 and 12 ensures that the parts of the clamping means are freed from one another and from the pipe connection.

Obviously the strip 13 may be formed from resilient metal to add to the forces tending to cause separation of the parts of the clamping means when the toggle clamp is released.

The modification of the clamping means of the invention shown in Figure 6 comprises means connecting the parts of the clamping means formed as a latch 43 having a hooked member 44 pivotally secured to one strip 24b₁ and a catch 45 struck up from the other strip 24a₁. The modified construction has the advantage that one less loose part requires to be fitted in position thereby making for more easy handling of a clamping means.

The modification illustrated in Figure 7 comprises a member connecting the parts of the clamping means which is arranged so that the clamping means is held together, opposite the toggle clamp (not shown) by a strip of spring steel 45 having laterally extending lugs at its ends by which it is retained in clips 46a, 46b, bent up from the ends of strips 24a₂ and 24b₂ or welded to the rigid arcuate members of the clamping means. The strip 45 may be formed curved away from the joint when the strip is in unstressed condition and will be flattened when the clamping means are in stressed condition as indicated in Figure 7, but will tend to throw the rigid arcuate members outwardly from the joint when the toggle clamp is released.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

A quick disconnect clamp for releasably holding a pair of tubular members together in fluid tight relation and in which one of said members has a belled-out end and the other a beveled end adapted to mate with said belled-out end, comprising: a pair of separate arcuate members of rigid construction normally having an opposed relation with respect to each other when in an operative position and each member having oppositely and inwardly sloped walls adapted to engage and force together said belled-out and beveled ends when in mating relation; means connecting one pair of adjacent ends of said rigid members; resilient strap means attached to the outer peripheries of said rigid members and having free adjacent ends; a toggle latch including an elongated body member of channel section one end of which is pivotally secured to one of the free ends of said resilient means; a rotatable abutment pivotally mounted in the opposite end of said body member and having a threaded hole therethrough transverse to its pivotal axis; an abutment member pivotally secured to the other free end of said resilient means and adapted to be received in said channel section latch body between the rotatable abutments mounted therein and provided with a diametral hole therein; a threaded pin having its inner end formed to engage in said diametral hole; a head at the outer end of said threaded pin by which the position of the pin may be adjusted in the threaded hole in the rotatable abutment mounted in the opposite end of said body member, said resilient strap means enabling said toggle latch means to be forced over dead center when placing said quick disconnect clamp in operative position and also when releasing said clamp.

References Cited in the file of this patent

UNITED STATES PATENTS

| | | |
|---|---|---|
| 351,397 | Payne | Oct. 26, 1886 |
| 593,906 | Pound | Nov. 16, 1897 |
| 1,895,827 | Van Hecke | Jan. 31, 1933 |
| 2,390,801 | Markey | Dec. 11, 1945 |
| 2,480,015 | Goode | Aug. 23, 1949 |
| 2,662,784 | Livers | Dec. 15, 1953 |
| 2,689,141 | Kiekhnefer | Sept. 14, 1954 |
| 2,706,648 | Gosse | Apr. 19, 1955 |

FOREIGN PATENTS

| | | |
|---|---|---|
| 378,640 | France | Aug. 17, 1907 |
| 203,165 | Great Britain | Sept. 6, 1923 |
| 230,771 | France | Jan. 31, 1944 |
| 284,546 | Switzerland | Dec. 1, 1952 |
| 735,271 | Great Britain | Aug. 17, 1955 |